(12) United States Patent
Kim et al.

(10) Patent No.: US 8,725,089 B2
(45) Date of Patent: May 13, 2014

(54) FIRST HUB AND SECOND HUB COMMUNICATING BY TEMPORAL CONNECTION BETWEEN DIFFERENT WIRELESS BODY AREA NETWORKS (WBANS) AND COMMUNICATION METHOD THEREOF

(75) Inventors: Young Soo Kim, Seoul (KR); Chang Soon Park, Chungju-si (KR); Young Jun Hong, Seoul (KR); Daesik Hong, Seoul (KR); Seokwon Lee, Seoul (KR); Hyungsik Ju, Yongin-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 276 days.

(21) Appl. No.: 13/357,684

(22) Filed: Jan. 25, 2012

(65) Prior Publication Data

US 2013/0172042 A1    Jul. 4, 2013

(30) Foreign Application Priority Data

Dec. 29, 2011    (KR) .......................... 10-2011-0146121

(51) Int. Cl.
*H04B 1/034*    (2006.01)

(52) U.S. Cl.
USPC ............................................. 455/100; 607/18

(58) Field of Classification Search
USPC ............ 455/41.1, 13.1, 444, 100; 607/18, 57, 607/156
See application file for complete search history.

(56) References Cited

U.S. PATENT DOCUMENTS

2010/0202354 A1    8/2010    Ho
2011/0196451 A1*   8/2011    Hill .................................. 607/60

FOREIGN PATENT DOCUMENTS

| KR | 10-2011-0006227 A | 1/2011 |
| KR | 10-2011-0012865 A | 2/2011 |
| KR | 10-2011-0050313 A | 5/2011 |

* cited by examiner

*Primary Examiner* — Tu X Nguyen
(74) *Attorney, Agent, or Firm* — NSIP Law

(57) ABSTRACT

Provided are a first hub corresponding to a first WBAN and a second hub corresponding to a second WBAN which may communicate with each other through a temporal connection. The temporal connection may decrease the usage of additional data, complexity, and power consumption that typically occurs due to mutual communication between different WBANs.

15 Claims, 6 Drawing Sheets

○ : HUB NODE
△ : SENSOR NODE

FIRST HUB AND SECOND HUB COMMUNICATING BY TEMPORAL CONNECTION BETWEEN DIFFERENT WIRELESS BODY AREA NETWORKS (WBANS) AND COMMUNICATION METHOD THEREOF

CROSS-REFERENCE TO RELATED APPLICATION(S)

This application claims the benefit under 35 U.S.C. §119(a) of Korean Patent Application No. 10-2011-0146121, filed on Dec. 29, 2011, in the Korean Intellectual Property Office, the entire disclosure of which is incorporated herein by reference for all purposes.

BACKGROUND

1. Field

The following description relates to a first hub and a second hub that communicate with each other through a temporal connection between different wireless body area networks (WBANs).

2. Description of Related Art

In an Institute of Electrical and Electronics Engineers (IEEE) 802.15.4 standard based on a ZigBee system, mesh network technology may use a plurality of coordinators. The mesh network technology enables the plurality of coordinators and sensors to perform hierarchical communication by enabling a plurality of piconets to make up a single mesh network.

However, schemes based on the mesh network technology require complex topology configuration and routing, and thus, may be unsuitable for a wireless body area network (WBAN) system which typically performs at a lower power and a lower complexity. In addition, an IEEE 802.15.6 standard based WBAN may provide a star topology in which a plurality of sensors are connected to a single hub in an effort to reduce power consumption and system complexity. Accordingly, a mesh typed topology in which a plurality of hubs are present may not be supported.

Accordingly, there is a desire for technology that enables communication between WBANs without having to configure a complex mesh network and without having to change a star topology.

SUMMARY

In one general aspect, there is provided a communication method of a hub in a network comprising the hub corresponding to a first wireless body area network (WBAN) and a neighboring hub corresponding to a neighboring WBAN, the method including requesting the neighboring hub for a temporal connection for communication with the neighboring WBAN, receiving information used for connection with a target sensor that is selected from within the neighboring WBAN, and performing the temporal connection with the target sensor using the information used for connection with the target sensor, wherein the target sensor operates as a sensor node of the hub through the temporal connection while simultaneously maintaining a connection with the neighboring hub.

The method may further comprise determining whether information used for connection with the target sensor matches identification (ID) information of the target sensor, and receiving a signal via the temporal connection from the target sensor based on the determination result.

The method may further comprise discovering WBANs that neighbor the first WBAN, and selecting the neighboring WBAN from the neighbor WBANs.

The method may further comprise storing information that is used for connection with the target sensor.

The method may further comprise transmitting, to the neighboring hub, a signal requesting termination of the temporal connection, in response to communication with the target sensor being terminated.

In another aspect, there is provided a communication method of a hub in a network comprising the hub corresponding to a first wireless body area network (WBAN) and a neighboring hub corresponding to a neighboring WBAN, the method including receiving, from the neighboring hub, a temporal connection request for communication with a sensor node that is included within the first WBAN, selecting a target sensor for the temporal connection request, and transmitting information for temporal connection to each of the neighboring hub and the target sensor, wherein the target sensor operates as a sensor node of the neighboring through the temporal connection while simultaneously maintaining connection with the hub.

The transmitting may comprise transmitting, to the neighboring hub, an identification (ID) of the target sensor, and transmitting, to the target sensor, an ID of the neighboring hub and an ID of the neighboring WBAN.

The target sensor may receive a signal via the temporal connection from the neighboring hub, based on whether information used for the temporal connection matches ID information of the neighboring hub.

The method may further comprise receiving, from the neighboring hub, a signal requesting termination of the temporal connection, and transmitting, to the target sensor, the signal requesting termination of the temporal connection.

The target sensor may terminate the temporal connection by setting a value of a temporal connection field to a first value, in response to receiving the signal requesting termination of the temporal connection.

In another aspect, there is provided a computer-readable storage medium having stored therein program instructions to cause a processor to execute a communication method of a hub in a network comprising the hub corresponding to a first wireless body area network (WBAN) and a neighboring hub corresponding to a neighboring WBAN, the method including requesting the neighboring hub for a temporal connection for communication with the neighboring WBAN, receiving information used for connection with a target sensor selected from within the neighboring WBAN, and performing the temporal connection with the target sensor using the information used for connection with the target sensor, wherein the target sensor operates as a sensor node of the hub through the temporal connection while simultaneously maintaining a connection with the neighboring hub.

In another aspect, there is provided a hub in a network comprising the hub corresponding to a first wireless body area network (WBAN) and a neighboring hub corresponding to a neighboring WBAN, the hub including a request unit to request the neighboring hub for a temporal connection for communication with the neighboring WBAN, a receiver to receive information used for connection with a target sensor selected from within the neighboring WBAN, and a performing unit to perform the temporal connection with the target sensor using information used for connection with the target sensor, wherein the target sensor operates as a sensor node of the hub through the temporal connection while simultaneously maintaining a connection with the neighboring hub.

The hub may further comprise a determining unit to determine whether information used for connection with the target sensor matches identification (ID) information of the target sensor, wherein the receiver is configured to receive a signal via the temporal connection from the target sensor based on the determination result.

In another aspect, there is provided a hub in a network comprising the hub corresponding to a first wireless body area network (WBAN) and a neighboring hub corresponding to a neighboring WBAN, the hub including a receiver to receive, from the neighboring hub, a temporal connection request for communication with a sensor node included within the first WBAN, a selector to select a target sensor for the temporal connection request, and a transmitter to transmit information for temporal connection to each of the neighboring hub and the target sensor, wherein the target sensor operates as a sensor node of the neighboring hub through the temporal connection while maintaining a connection with the hub.

The transmitter may be configured to transmit, to the neighboring hub, information comprising an identification (ID) of the target sensor, and to transmit, to the target sensor, information comprising an ID of the neighboring hub and an ID of the neighboring WBAN.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
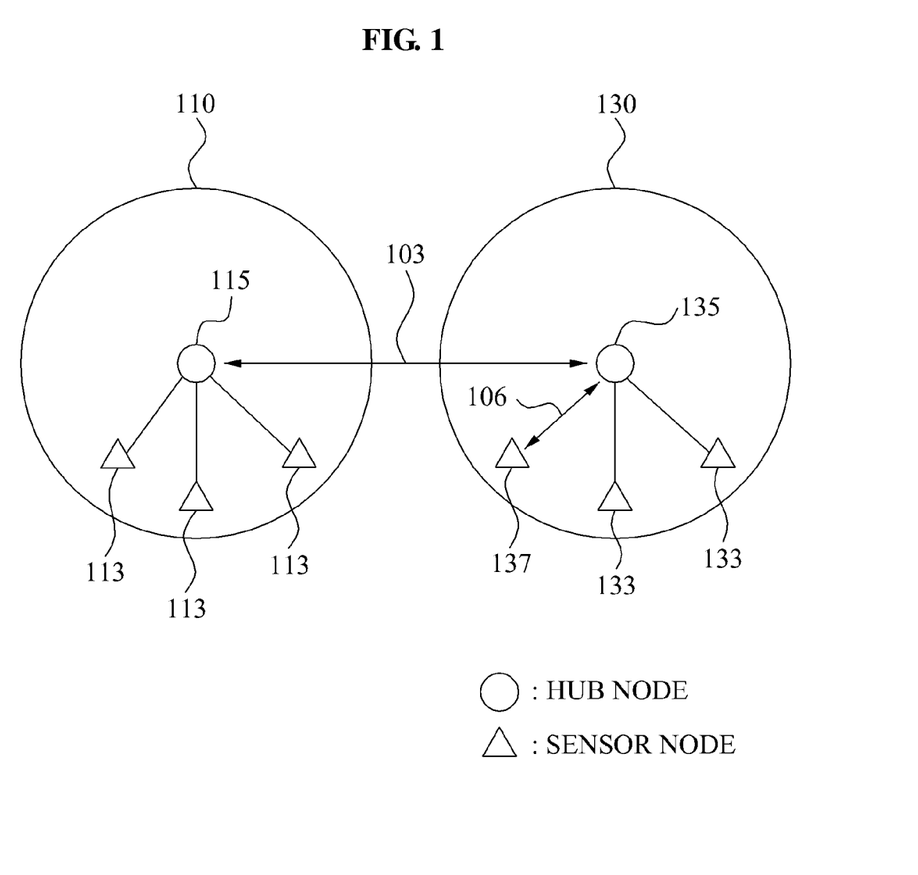
FIG. 1 is a diagram illustrating an example of transmitting and receiving data based on an Institute of Electrical and Electronics Engineers (IEEE) 802.15.6 standard in an environment in which two wireless body area networks (WBANs) coexist.

FIG. 1 illustrates an example of transmitting and receiving data based on an Institute of Electrical and Electronics Engineers (IEEE) 802.15.6 standard in an environment in which two wireless body area networks (WBANs) coexist. Referring to FIG. 1, the two WBANs that desire to perform mutual communication are a first WBAN 110 and a second WBAN 130.

In this example, the first WBAN 110 includes a first hub 115 and a plurality of sensor nodes 113, and the second WBAN 130 includes a second hub 135 and a plurality of sensor nodes 133 and 137. In this example, each sensor node may be directly connected to a hub included in a corresponding WBAN to form a star topology.

As an example, the sensor nodes may be in communication with a hub such as a terminal. Examples of the terminal include a smart phone, computer, tablet, home appliance, and the like. The sensor node may sense various data, for example, home security, medical applications, mobile healthcare, monitoring of chemical/biological features of a patient, mechanical failure diagnosis, environmental monitoring, sensing of information regarding disasters, intelligent physical distribution management, real-time security, remote monitoring, and the like.

An identification of an independent body area network (BAN), an identification (ID) of a hub, and an ID of a sensor node for connection may be assigned to each hub and sensor node included in each WBAN. For example, the ID of an independent BAN may be a BAN_ID, an ID of a hub may be a Hub_ID, and an ID of the sensor node may be a Connected_NID.

In a data transmission/reception process based on the IEEE 802.15.6 standard, if an ID of a BAN of a received signal and a recipient ID match an ID of a receiving end, the receiving end may receive data. For example, each WBAN may independently operate based on a user, and thus, communication may become impossible or difficult unless information is shared between WBANs.

In the example of FIG. 1, as indicated by lines 103 and 106, the first WBAN 110 may communicate with the second WBAN 130 through the first hub 115, the second hub 135, and a target sensor, for example, the sensor node 137. However, while transmitting data through the two operations 103 and 106, overhead may occur.

Figure 2:
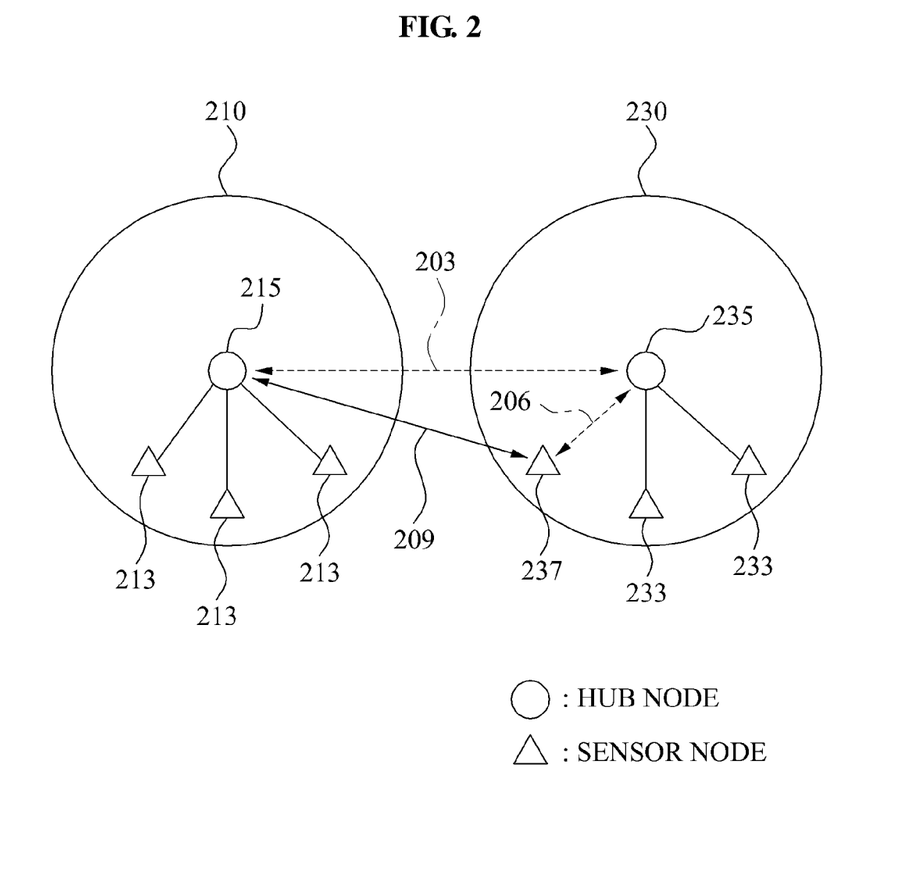
FIG. 2 is a diagram illustrating an example of a temporal connection that is temporarily performed between different WBANs.

FIG. 2 illustrates an example of a temporal connection that is temporarily performed between different WBANs.

Referring to FIG. 2, the WBANs include a first WBAN 210 and a second WBAN 230. In this example, the first WBAN 210 includes a first hub 215 and a plurality of sensor nodes 213, and the second WBAN 230 includes a second hub 235 and a plurality of sensor nodes 233 and 237.

As indicated by a dotted line 203, to communicate with the neighboring second WBAN 230, the first hub 215 may transmit a temporal connection request message to the second hub 235. In response to the temporal connection request message, the second hub 235 may select a suitable target sensor, for example, the sensor node 237, from among the plurality of sensor nodes 233 and 237 that are within the second WBAN 230. The second hub 235 may transfer, to the first hub 215, information that may be used for connection with the selected target sensor. For example, the second hub 235 may transfer the information using an I_ACK frame. As indicated by a dotted line 206, to form the temporal connection, the second hub 235 may transmit a BAN_ID of the first WBAN 210 and HID of the first hub 215 to the sensor node 237.

In this example, the temporal connection is formed between the first hub 215 and the sensor node 237 corresponding to the target sensor as indicated by a line 209. Accordingly, the sensor node 237 corresponding to the target sensor may operate as a sensor node of the first WBAN 210 while maintaining connection with the second hub 235.

For example, if a BAN_ID of the first WBAN 210 and an HID of the first hub 215 match the received information, the sensor node 237 may receive a signal from the first hub 215. If the received information used for connection with the target sensor matches an ID of the sensor node 237 corresponding to the target sensor, the first hub 215 may receive a signal from the sensor node 237.

Figure 3:
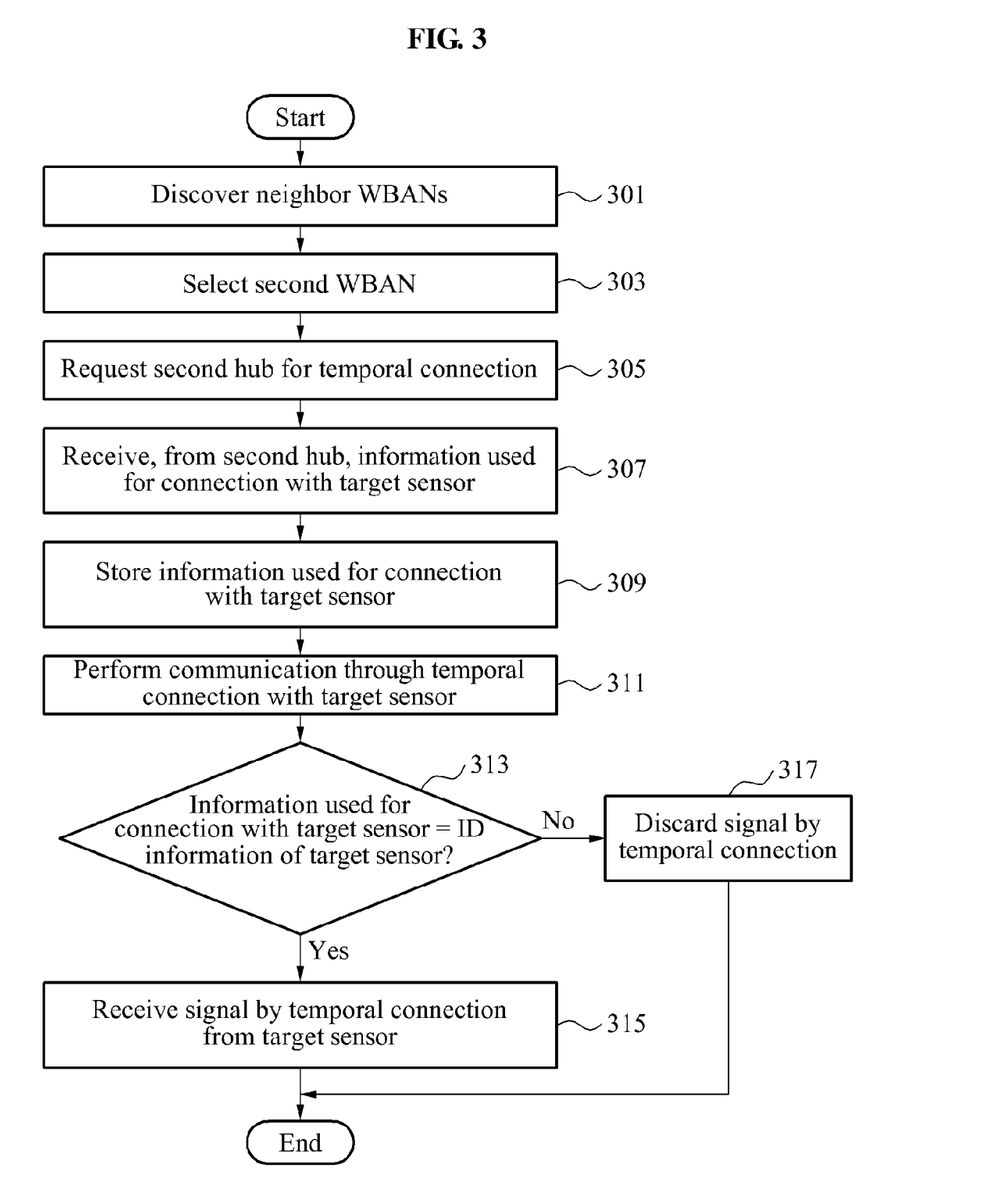
FIG. 3 is a flowchart illustrating an example of a communication method of a first hub.

FIG. 3 illustrates an example of a communication method of a first hub.

Referring to FIG. 3, in 301, a first hub for a first WBAN discovers one or more WBANs that neighbor the first WBAN. In 303, the first hub selects a neighboring WBAN (i.e. a second WBAN) from among the neighboring WBANs. For example, the first hub may select a neighboring WBAN based on a user intent of the first WBAN or automatically without a user input.

In 305, the first hub requests a second hub for a temporal connection to communicate with the second WBAN. In 307, the first hub receives, from the second hub, information used for connection with a target sensor. In response to the temporal connection request, the target sensor may be selected from among the target sensors included in the second WBAN, by the second hub. In 309, the first hub stores information used for connection with the target sensor. In 311, the first hub performs a temporal connection with the target sensor using information for connection with the target sensor. In this example, the first hub may perform communication through the temporal connection with the target sensor.

In 313, the first hub determines whether the corresponding information matches ID information of the target sensor. In response to the corresponding information matching the ID information of the target sensor in 313, the first hub receives a signal by the temporal connection from the target sensor in 315. On the contrary, if the corresponding information does not match the ID information of the target sensor in 313, the first hub does not receive or otherwise discards the signal by the temporal connection in 317.

In response to the communication with the target sensor being terminated, the first hub may transmit, to the second hub, a signal requesting termination of the temporal connection. In response to the signal requesting termination of the temporal connection, the second hub may transfer the corresponding signal to the target sensor to terminate the temporal connection with the first hub.

Figure 4:
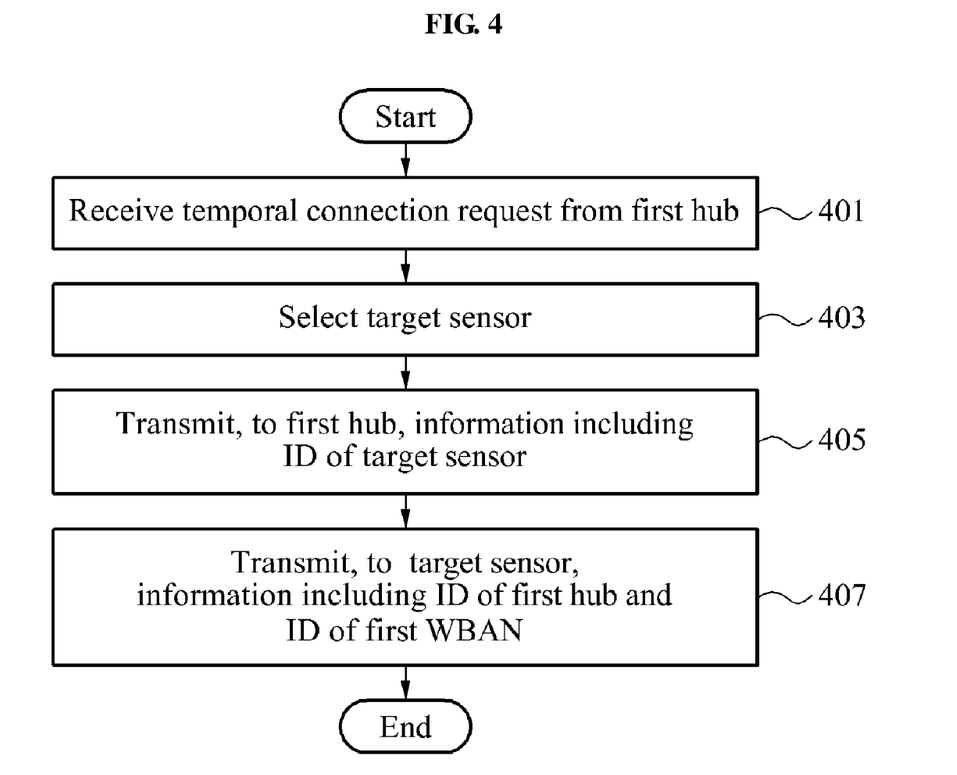
FIG. 4 is a flowchart illustrating an example of a communication method of a second hub.

FIG. 4 illustrates an example of a communication method of a second hub.

Referring to FIG. 4, in 401, the second hub receives a temporal connection request from a first hub. For example, the temporal connection request may be a request for the first hub to communicate with a sensor node served by the second hub, that is, a target sensor included in a second WBAN.

In response to the temporal connection request, in 403 the second hub selects a suitable target sensor from within the second WBAN.

In 405 and 407, the second hub transmits information used for a temporal connection to each of the first hub and the target sensor. For example, in 405 the second hub transmits information to the first hub. The information may include an ID of the target sensor. In 407, the second hub transmits information to the target sensor. The information may include an ID of the first hub and an ID of a first WBAN in 407. While in this example 407 is performed subsequent to 405, it should be appreciated that other embodiments are within the scope of the examples herein. For example, 407 may be performed prior to 405, or 405 and 407 may be performed simultaneously.

Through the above process, the target sensor may perform a temporal connection with the first hub. Through the temporal connection, the target sensor may operate as a sensor node of the first hub while simultaneously maintaining a connection with the second hub.

For example, the target sensor may receive a signal by the temporal connection from the first hub based on whether information used for the temporal connection matches ID information of the first hub. As another example, the second hub may receive, from the first hub, a signal requesting termination of the temporal connection, and may transmit the received signal to the target sensor. In response to the signal requesting termination of the temporal connection, the target sensor may terminate the temporal connection by setting a value of a temporal connection field to a first value, for example, "0".

Figure 5:
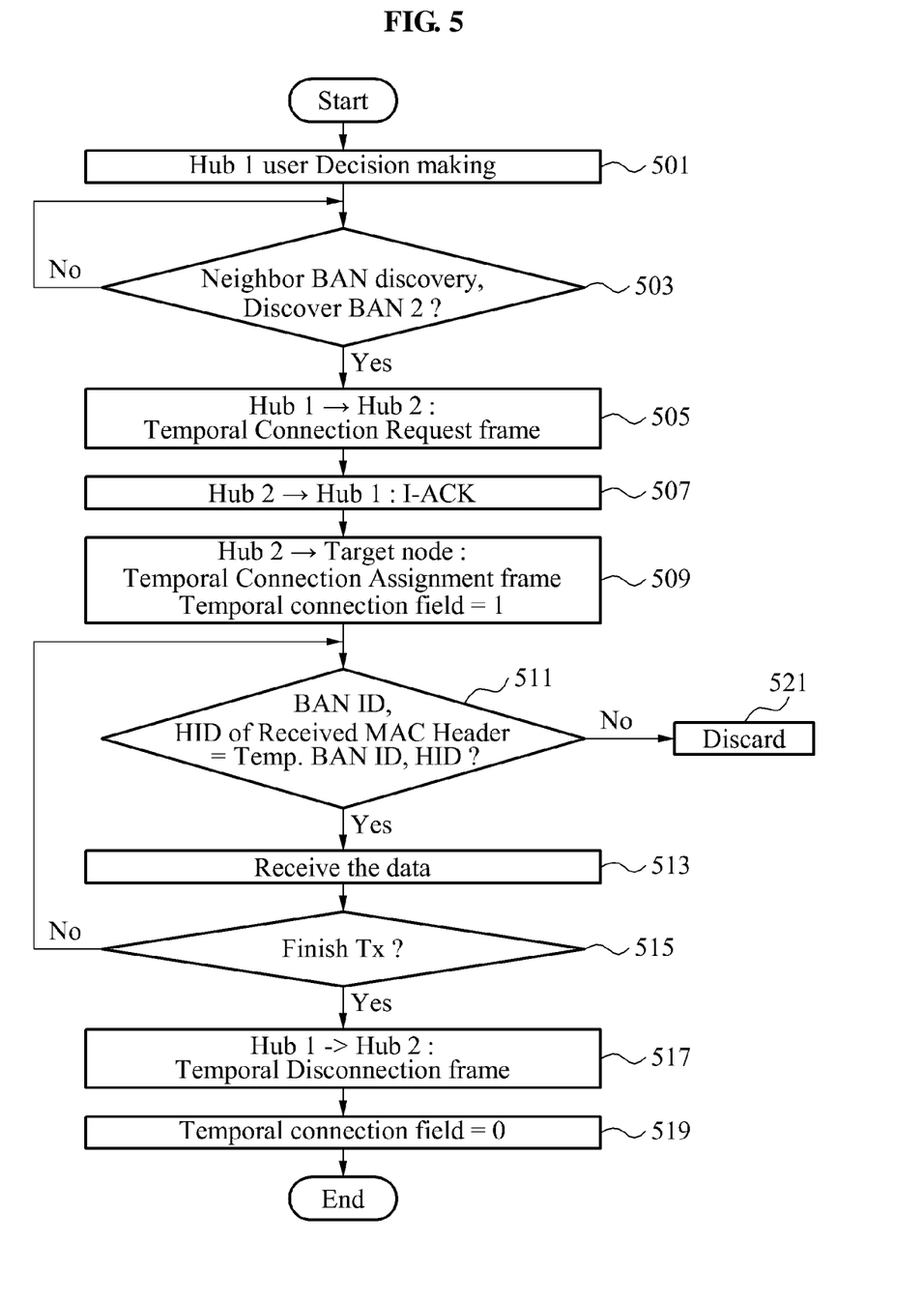
FIG. 5 is a flowchart illustrating an example of a signal flow for a temporal connection that is temporarily performed between multiple WBANs.

FIG. 5 illustrates an example of a signal flow for a temporal connection that is temporarily performed between multiple WBANs.

Referring to FIG. 5, in 501, a first hub receives user decision of a user of a first WBAN that requests communication with a neighbor WBAN. The first hub may receive information associated with a WBAN desired by the user of the first WBAN. As another example, the first hub may receive a request for all neighboring WBANs.

In 503, the first hub selects or discovers the desired WBAN, for example, a second WBAN by discovering neighboring WBANs. Unless the second WBAN is discovered in 503, the first hub may wait until the second WBAN is selected.

If the first hub selects the desired second WBAN through discovery of the neighbor WBANs, the first hub transmits a temporal connection request to a second hub for the second WBAN in 505. Through the transmitting the temporal connection request in 505, the first hub may include, in a temporal connection request frame, an ID (BAN ID) of the first WBAN including the first hub and an ID (HID) of the first hub. Also, the first hub may transmit the temporal connection request frame.

In response to the temporal connection request from the first hub, the second hub selects a suitable target sensor, and transmits a temporal connection assignment signal to each of the first sensor and the target sensor in 507 and 509.

For example, through the transmitting of the temporal connection assignment signal in 507, the second hub may transmit, to the first hub, an I-ACK frame including an ID (NID) of the target sensor.

Through the transmitting of the temporal connection assignment signal in 509, the second hub may transmit, to the target sensor, a temporal connection assignment frame including an ID (BAN_ID) of a WBAN including the first hub and an ID (HID) of the first hub. In response to the target sensor receiving the temporal connection assignment frame, the target sensor may indicate that the temporal connection is formed by setting a value of a temporal connection field to "1".

In 511, each of the first hub and the target sensor determines whether information included in a header of a media access control (MAC) header of the received temporal connection assignment frame, matches corresponding ID information. The information included in the header of the MAC header may include, for example, the ID (BAN_ID) of the WBAN and the ID (HID) of the first hub. The corresponding ID information may include, for example, Temp. BAN ID and HID (Hub 1).

In response to the information matching the corresponding ID information in 511, each of the first hub and the target sensor operates in a temporal connection mode to transmit and receive data therebetween in 513.

On the contrary, if information does not match the corresponding ID information in 511, the first hub does not receive or discards a signal by the temporal connection, in 521.

In response to the data transmission between the first hub and the target sensor being terminated in 515, the first hub transmits, to the second hub, a temporal disconnection frame indicating termination of the temporal connection in 517.

On the contrary, if the data transmission between the first hub and the target sensor is not terminated in 515, each of the first hub and the target sensor may determine whether information of a new frame received from the second hub matches corresponding ID information. In this example, if the second hub receives the temporal disconnection frame, the target sensor verifies that the temporal connection is terminated and terminates the temporal connection mode by setting a value of the temporal connection field to "0" in 519.

Figure 6:
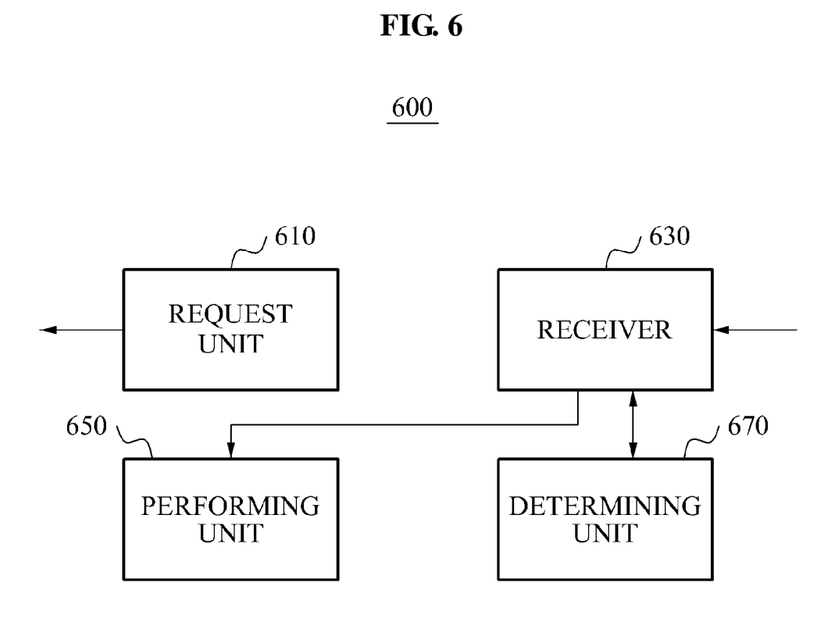
FIG. 6 is a diagram illustrating an example of a first hub.

FIG. 6 illustrates an example of a first hub 600.

In a network including a first hub for a first WBAN and a second hub for a second WBAN, an example of the first hub for communication is as follows.

Referring to FIG. 6, the first hub 600 includes a request unit 610, a receiver 630, a performing unit 650, and a determining unit 670. The request unit 610 may request the second hub for a temporal connection for communication with the second WBAN. In response to the request, the receiver 630 may receive information used for connection with a target sensor selected from within the second WBAN. The connection information may be received from the second hub.

The performing unit 650 may perform a temporal connection with the target sensor using information used for connection with the target sensor. In this example, the target sensor may operate as a sensor node of the first node through the temporal connection while maintaining a connection with the second hub. The determining unit 670 may determine whether information used for connection with the target sensor matches ID information of the target sensor. For example, the receiver 630 may receive a signal through the temporal connection from the target sensor based on the determination result.

Figure 7:
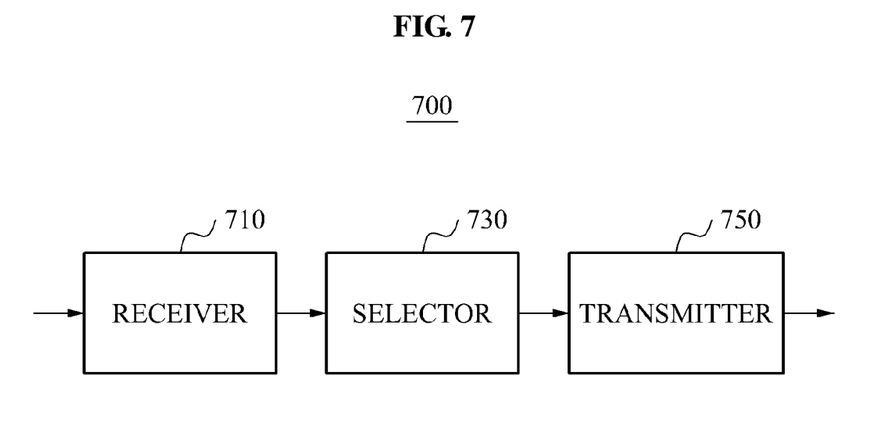
FIG. 7 is a diagram illustrating an example of a second hub.

FIG. 7 illustrates an example of a second hub 700.

In a network including a first hub for a first WBAN and a second hub for a second WBAN, an example of the second hub for communication is as follows.

Referring to FIG. 7, the second hub 700 includes a receiver 710, a selector 730, and a transmitter 750. The receiver 710 may receive, from the first hub, a temporal connection request for communication with a sensor node that is included within the second WBAN. The selector 730 may select a target sensor that is suitable for the temporal connection request.

The transmitter 750 may transmit information for a temporal connection to each of the first hub and the target sensor. The target sensor may operate as a sensor node of the first node through the temporal connection while maintaining connection with the second hub. The transmitter 750 may transmit, to the first hub, information including an ID of the target sensor, and may transmit, to the target sensor, information including an ID of the first hub and an ID of the first WBAN.

According to various examples herein, by forming a temporal connection or a to temporary connection between a hub and a sensor node without transmitting and receiving data between hubs, it is possible to enable data to be directly transmitted and received between a hub and a target sensor.

According to various examples herein, by forming a temporal connection between a hub and a sensor node without transmitting and receiving data between hubs, it is possible to decrease additional overhead occurring in communication between hubs, and to decrease power consumption in a WBAN.

According to various examples herein, by transferring information of a target sensor included in a WBAN to an object hub included in another WBAN, and by forming a temporal connection between the object hub and the target sensor, it is possible to decrease the usage of additional data and complexity that typically occurs due to mutual communication between different WBANs.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a hub in a network comprising the hub corresponding to a first wireless body area network (WBAN) and a neighboring hub corresponding to a neighboring WBAN, the method comprising:
   requesting the neighboring hub for a temporal connection for communication with the neighboring WBAN;
   receiving information used for connection with a target sensor that is selected from within the neighboring WBAN; and
   performing the temporal connection with the target sensor using the information used for connection with the target sensor,
   wherein the target sensor operates as a sensor node of the hub through the temporal connection while simultaneously maintaining a connection with the neighboring hub.

2. The method of claim 1, further comprising:
   determining whether information used for connection with the target sensor matches identification (ID) information of the target sensor; and
   receiving a signal via the temporal connection from the target sensor based on the determination result.

3. The method of claim 1, further comprising:
   discovering WBANs that neighbor the first WBAN; and
   selecting the neighboring WBAN from the neighbor WBANs.

4. The method of claim 1, further comprising:
   storing information that is used for connection with the target sensor.

5. The method of claim 1, further comprising:
   transmitting, to the neighboring hub, a signal requesting termination of the temporal connection, in response to communication with the target sensor being terminated.

6. A communication method of a hub in a network comprising the hub corresponding to a first wireless body area network (WBAN) and a neighboring hub corresponding to a neighboring WBAN, the method comprising:
   receiving, from the neighboring hub, a temporal connection request for communication with a sensor node that is included within the first WBAN;
   selecting a target sensor for the temporal connection request; and
   transmitting information for temporal connection to each of the neighboring hub and the target sensor,
   wherein the target sensor operates as a sensor node of the neighboring through the temporal connection while simultaneously maintaining connection with the hub.

7. The method of claim 6, wherein the transmitting comprises:
   transmitting, to the neighboring hub, an identification (ID) of the target sensor; and
   transmitting, to the target sensor, an ID of the neighboring hub and an ID of the neighboring WBAN.

8. The method of claim 6, wherein the target sensor receives a signal via the temporal connection from the neighboring hub, based on whether information used for the temporal connection matches ID information of the neighboring hub.

9. The method of claim 6, further comprising:
   receiving, from the neighboring hub, a signal requesting termination of the temporal connection; and
   transmitting, to the target sensor, the signal requesting termination of the temporal connection.

10. The method of claim 9, wherein the target sensor terminates the temporal connection by setting a value of a temporal connection field to a first value, in response to receiving the signal requesting termination of the temporal connection.

11. A computer-readable storage medium having stored therein program instructions to cause a processor to execute a communication method of a hub in a network comprising the hub corresponding to a first wireless body area network (WBAN) and a neighboring hub corresponding to a neighboring WBAN, the method comprising:
   requesting the neighboring hub for a temporal connection for communication with the neighboring WBAN;
   receiving information used for connection with a target sensor selected from within the neighboring WBAN; and
   performing the temporal connection with the target sensor using the information used for connection with the target sensor,
   wherein the target sensor operates as a sensor node of the hub through the temporal connection while simultaneously maintaining a connection with the neighboring hub.

12. A hub in a network comprising the hub corresponding to a first wireless body area network (WBAN) and a neighboring hub corresponding to a neighboring WBAN, the hub comprising:
   a request unit to request the neighboring hub for a temporal connection for communication with the neighboring WBAN;
   a receiver to receive information used for connection with a target sensor selected from within the neighboring WBAN; and
   a performing unit to perform the temporal connection with the target sensor using information used for connection with the target sensor,
   wherein the target sensor operates as a sensor node of the hub through the temporal connection while simultaneously maintaining a connection with the neighboring hub.

13. The hub of claim 12, further comprising:
   a determining unit to determine whether information used for connection with the target sensor matches identification (ID) information of the target sensor,
   wherein the receiver is configured to receive a signal via the temporal connection from the target sensor based on the determination result.

14. A hub in a network comprising the hub corresponding to a first wireless body area network (WBAN) and a neighboring hub corresponding to a neighboring WBAN, the hub comprising:
   a receiver to receive, from the neighboring hub, a temporal connection request for communication with a sensor node included within the first WBAN;
   a selector to select a target sensor for the temporal connection request; and
   a transmitter to transmit information for temporal connection to each of the neighboring hub and the target sensor, wherein the target sensor operates as a sensor node of the neighboring hub through the temporal connection while maintaining a connection with the hub.

15. The hub of claim 14, wherein the transmitter is configured to transmit, to the neighboring hub, information comprising an identification (ID) of the target sensor, and to transmit, to the target sensor, information comprising an ID of the neighboring hub and an ID of the neighboring WBAN.

* * * * *